United States Patent
Dudding et al.

(10) Patent No.: US 6,609,764 B2
(45) Date of Patent: Aug. 26, 2003

(54) FABRICATED VEHICLE AXLE

(75) Inventors: Ashley Thomas Dudding, Plainfield, IL (US); Lawrence Edward Miller, Naperville, IL (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/845,047

(22) Filed: Apr. 27, 2001

(65) Prior Publication Data

US 2002/0158506 A1 Oct. 31, 2002

(51) Int. Cl.⁷ .............................................. B60B 35/00
(52) U.S. Cl. ..................... 301/124.1; 301/127
(58) Field of Search ............... 301/124.1, 125, 301/127, 129

(56) References Cited

U.S. PATENT DOCUMENTS

| | | | |
|---|---|---|---|
| 647,801 A | * | 4/1900 | Bruner ..................... 301/124.1 |
| 817,881 A | * | 4/1906 | Smith ....................... 301/124.1 |
| 1,762,407 A | * | 6/1930 | Mogford et al. ......... 301/124.1 |
| 1,823,158 A | * | 9/1931 | Mogford et al. ......... 301/124.1 |
| 1,899,347 A | * | 2/1933 | Mogford et al. ......... 301/124.1 |
| 2,148,714 A | * | 2/1939 | Urschel .................... 301/124.1 |
| 2,218,127 A | * | 10/1940 | Urschel .................... 301/124.1 |
| 2,911,262 A | * | 11/1959 | Franck ..................... 301/124.1 |
| 3,072,441 A | * | 1/1963 | Schilberg ................. 301/124.1 |
| 3,804,467 A | * | 4/1974 | Austermann ................. 301/127 |
| 5,269,593 A | * | 12/1993 | Wasson ..................... 301/124.1 |
| 5,429,423 A | * | 7/1995 | Pollock et al. ........... 301/124.1 |
| 5,520,407 A | * | 5/1996 | Alatalo et al. ............ 301/124.1 |
| 5,664,847 A | * | 9/1997 | Bear et al. ................ 301/124.1 |
| 5,800,024 A | * | 9/1998 | Steimmel et al. ........... 301/127 |
| 5,810,377 A | * | 9/1998 | Keller et al. ................ 280/96.1 |
| 5,865,452 A | | 2/1999 | Chalin |
| 6,196,563 B1 | * | 3/2001 | Haycraft ................. 301/124.1 |

* cited by examiner

*Primary Examiner*—S. Joseph Morano
*Assistant Examiner*—Long Beo Nguyen
(74) *Attorney, Agent, or Firm*—Cook, Alex, McFarron, Manzo, Cummings & Mehler, Ltd.

(57) ABSTRACT

A fabricated vehicle axle is shown to include a main body having an inverted U-shaped configuration. The fabricated vehicle axle further includes a continuous bottom plate welded to the main body. The fabricated axle also includes a first king pin top plate having a reversed curved fork portion welded to the main body at one end thereof. Similarly, the fabricated vehicle axle includes a second king pin top plate having a reversed curved fork portion welded to the main body at an opposite end thereof. Still further, the fabricated vehicle axle includes a first gooseneck part welded to the first king pin top plate and the first end of the bottom plate. Similarly, the fabricated vehicle axle includes a second gooseneck part welded to the second king pin top plate and the second end of the bottom plate.

92 Claims, 7 Drawing Sheets

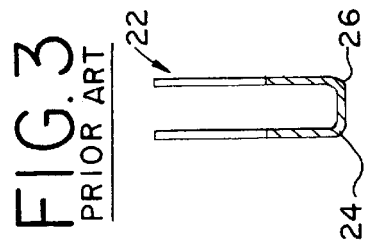
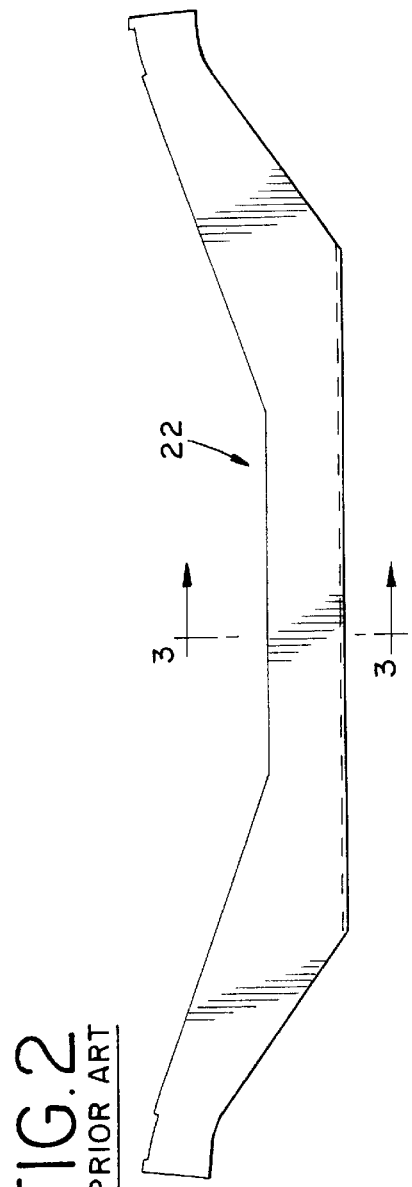

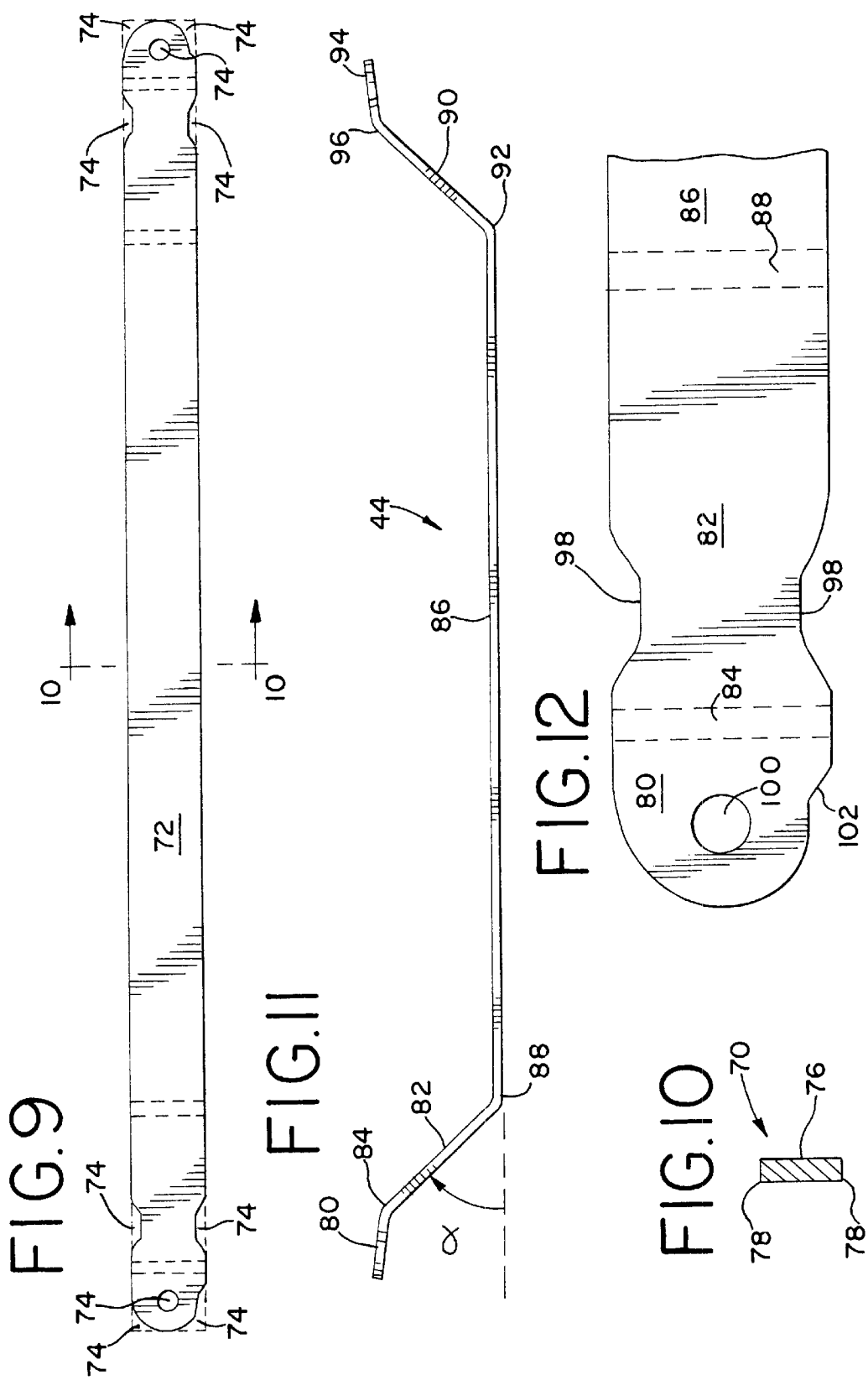

$L1 = H/2$ $L2 < H/2$

FABRICATED VEHICLE AXLE

BACKGROUND OF THE INVENTION

The present invention relates generally to axles for vehicles and more particularly to fabricated axles for vehicles.

Typical steer axle assemblies for vehicles include a forged I-beam axle, and a pair of steering knuckles pivotally attached to opposite ends of the axle by way of king pins. Although they are generally strong and reliable, such forged I-beam axles are limited in their shape, are relatively heavy, and require a relatively large amount of machining. All of this translates into increased manufacturing and payload costs.

In light of the foregoing, fabricated axles have been developed. Such axles are typically manufactured from sheets of steel that are cut and then welded together. Fabricated axles generally weigh less than forged I-beam axles. For example, a typical forged I-beam steering axle for use with the heavy-duty trucks weighs approximately one hundred ninety-five pounds, whereas an equivalent typical fabricated axle weighs approximately one hundred twenty-five pounds. In the case of commercial vehicles, including heavy-duty truck commercial vehicles, this translates into substantially increased payload capacity.

Another benefit of fabricated axles is that the material used (e.g., steel) can be spread around for more efficient distribution thereof. This can contribute to making the fabricated axle much lighter, and can even make it stiffer against both bending and torsion stresses. On top of all this, fabricated axles typically require less machining than forged I-beam axles. Accordingly, they are easier and less expensive to manufacture.

As implied above, fabricated axles are known in the art. An example of a fabricated axle is shown and described in U.S. Pat. No. 5,810,377, issued to Keeler et al., the disclosure of which is hereby incorporated herein by reference. The fabricated axle disclosed therein and incorporated herein by reference was a marked improvement over what was then the prior art and it is still useful for most purposes. However, it has now been recognized to have certain deficiencies. In particular, that fabricated axle does not utilize material efficiently, causing increased costs in manufacture and material waste. Furthermore, it fails to integrate several of the steering features that can be integrated in a fabricated axle for optimization of design, as demonstrated by the present invention. These and other deficiencies, many of which will be apparent to those skilled in the art, particularly after reading this description, have led to the development of the present invention.

Referring briefly to FIGS. 1–3, the main body part of the fabricated axle shown and described in U.S. Pat. No. 5,810,377 is illustrated. As shown, a plate 20 of material is used for the main body part of the material of the fabricated axle. A main body blank 22 is cut from plate 20 to form the main body of the fabricated axle. The remainder of plate 20 is waste and left unused. This waste material is identified by reference numeral 23 in FIG. 1. The main body blank 22 is then bent or folded along lines 24, 26 to form the main body of the fabricated axle. The main body blank forms a U-channel configuration at its central portion, as best shown in FIG. 3. As will be appreciated, the fabricated axle is also formed with additional sheets of metal welded to its main body. Reference can be made to U.S. Pat. No. 5,810,377 for further understanding of this construction.

As will be appreciated, a relatively large amount of material is wasted during construction of the fabricated axle shown and described in U.S. Pat. No. 5,810,377. This results in a considerable drawback to the extent that it becomes more expensive to manufacture that fabricated axle. Reasons for this inefficient use of material is that the main body part extends completely along the length of the steering axle such that it has an irregular shape, as shown in FIG. 1.

In light of the foregoing, it is desirable to provide for a fabricated vehicle axle that has substantially high material utilization.

It is also desirable to provide for a fabricated vehicle axle offering increased strength to bending and torsion stresses.

It is further desirable to provide for a fabricated vehicle axle that is less expensive to manufacture.

It is still further desirable to provide for a fabricated vehicle axle that integrates several of the steering system component functions.

These and other benefits of the preferred form of the invention will become apparent from the following description. It will be understood, however, that an apparatus could still appropriate the invention claimed herein without accomplishing each and every one of these benefits, including those gleaned from the following description. The appended claims, not the above listed benefits, define the subject matter of this invention. Any and all benefits are derived from the preferred form of the invention, not necessarily the invention in general.

BRIEF SUMMARY OF THE INVENTION

The present invention is directed to a fabricated vehicle axle that includes a main body having an inverted U-shaped configuration. The fabricated vehicle axle further includes a continuous bottom plate welded to the main body. The continuous bottom plate has a first end with a first king pin bore extending through it and a second end with a second king pin bore extending through it. The fabricated vehicle axle also includes a first king pin top plate welded to the main body. The first king pin top plate has a third king pin bore extending through it in substantial alignment with the first king pin bore. Similarly, the fabricated vehicle axle includes a second king pin top plate welded to the main body. The second king pin top plate has a fourth king pin bore extending through it in substantial alignment with the second king pin bore. Still further, the fabricated vehicle axle includes a first gooseneck part welded to the first king pin top plate and the first end of the bottom plate. Similarly, the fabricated vehicle axle includes a second gooseneck part welded to the second king pin top plate and the second end of the bottom plate.

BRIEF DESCRIPTION OF THE SEVERAL VIEWS OF THE DRAWING

In the following detailed description, reference has been and will frequently be made to the following views of the drawing, in which like reference numerals refer to like components, and in which:

FIG. 1 is a top plan view of the main body part of a prior art fabricated vehicle axle, depicting the inefficient material utilization for construction of same;

FIG. 2 is a front elevational view of the main body part of the prior art fabricated vehicle axle shown in FIG. 1;

FIG. 3 is a sectional view of the main body part of the prior art fabricated vehicle axle taken along line 3—3 of FIG. 2;

FIG. 9 is a top plan view of the bottom plate used in the fabricated vehicle axle shown in FIG. 4;

FIG. 10 is a sectional view of the bottom plate shown in FIG. 9 taken along line 9—9 thereof;

FIG. 11 is a front elevational view of the bottom plate used in the fabricated vehicle axle shown in FIG. 4;

FIG. 12 is a detailed view of the head area included at each end of the bottom plate shown in FIG. 9;

DETAILED DESCRIPTION OF THE INVENTION

Figure 4:
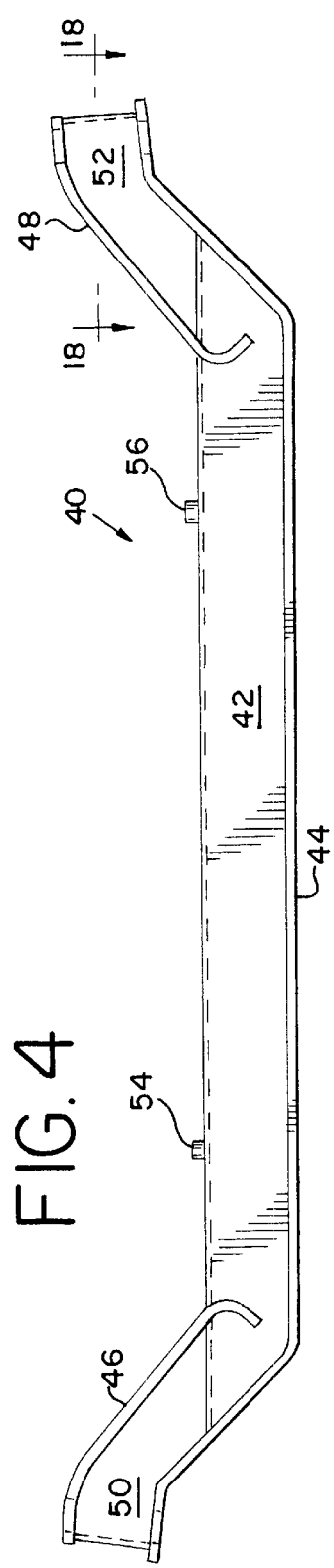
FIG. 4 is a front elevational view of a fabricated vehicle axle constructed in accordance with the principles of the present invention.
Figure 5:
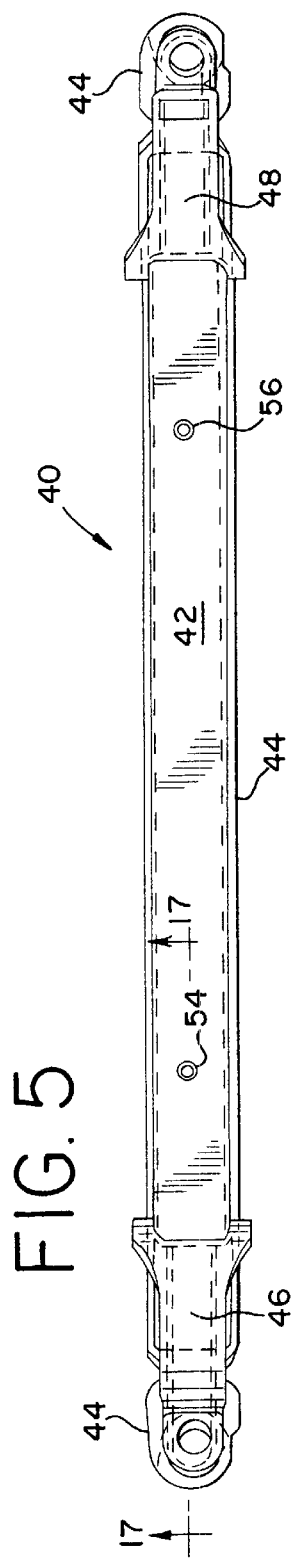
FIG. 5 is a top plan view of the fabricated vehicle axle shown in FIG. 4.

FIGS. 4 and 5 illustrate a fabricated vehicle axle generally designated 40 constructed in accordance with the principles of the present invention. Fabricated axle 40 generally includes a main body 42, a bottom plate 44, two top king pin plates 46, 48 positioned on opposite ends of the axle, and two gooseneck parts 50, 52 also positioned on opposite ends of the axle. As will be appreciated, each of the parts for fabricated axle 40 are welded together along their respective points and lines of intersection. Also shown welded to main body 42 are suspension seat areas 54, 56.

Figure 6:
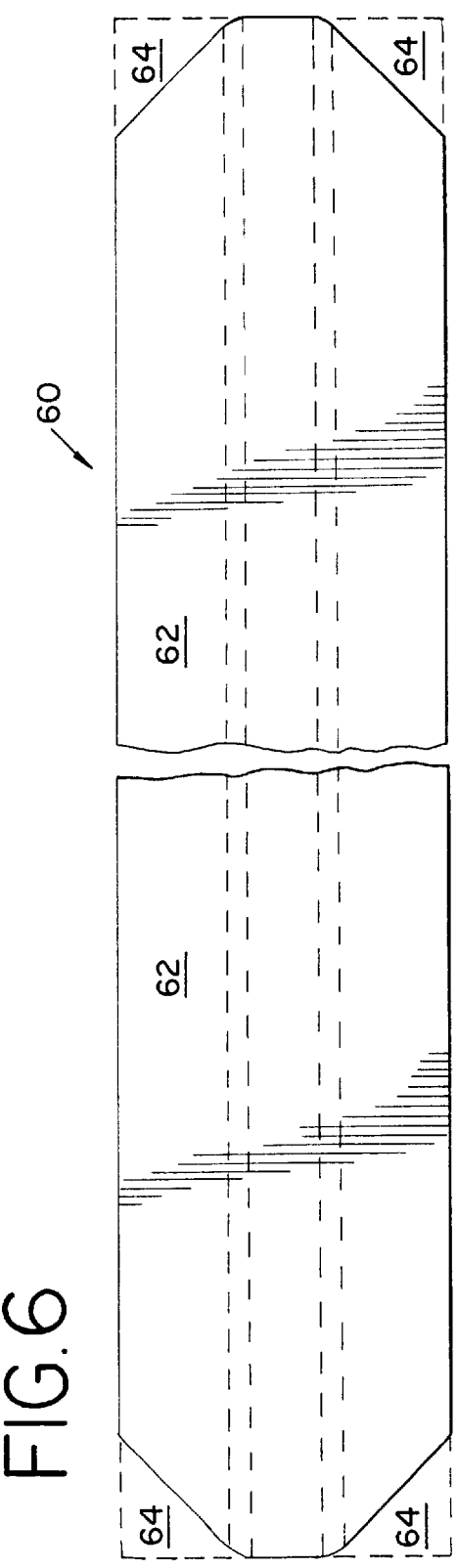
FIG. 6 is a top plan view of the main body of the fabricated vehicle axle shown in FIG. 4.
Figure 7:
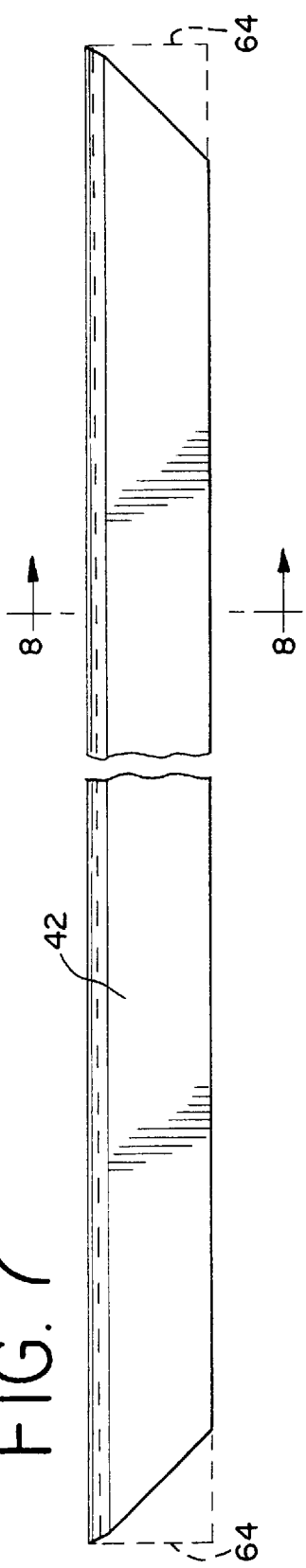
FIG. 7 is a front elevational view of the main body of the fabricated vehicle axle shown in FIG. 4.
Figure 8:
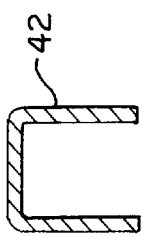
FIG. 8 is a sectional view of the main body of the fabricated vehicle axle shown in FIG. 7 taken along line 8—8 thereof.

FIGS. 6–8 illustrate the main body 42 of fabricated axle 40. Referring first to FIG. 6, a rectangular strip of material 60 is utilized to form a main body blank 62. Main body blank 62 is cut from strip 60 using one of several conventional techniques known in the art, leaving minimal amounts of waste material 64. As shown, no portion of the finished main body exceeds the envelope of strip 60. This solution offers much better material utilization than the prior art. The cuts form tapering edges at the opposite ends of main body blank 62 in order to permit accommodation of the transition zones for the bottom plate 44 of fabricated axle 40, as further described below with reference to FIG. 10.

As best shown in FIG. 7, the main body blank is formed to make the main body 42 of fabricated axle 40. The cross-section of main body 42 is an inverted U-shaped configuration, as shown in FIG. 8.

Alternatively, a roll formed channel having a U-shaped cross-section could be used to form the main body directly. In that case, it would be unnecessary to manufacture a main body blank and form the main body for fabricated axle.

In view of the foregoing, it will be appreciated that main body 42 can be constructed from strip or a roll formed channel. The strip or roll formed channel is cut to its desired length and shape with a small trim on the ends, resulting in minimal waste. In turn, this translates into reduced manufacturing costs.

FIGS. 9–12 illustrate the bottom plate 44 of fabricated axle 40. Referring first to FIG. 9, a rectangular strip of material 70 is utilized to form a bottom plate blank 72. Bottom plate blank 72 is cut from strip 70 using one of several conventional techniques known in the art, leaving minimal amounts of waste material 74. The end details for bottom plate 44 are cut by robotic plasma cutting or blanking dies. As shown, no portion of the finished bottom plate exceeds the envelope of strip 70. This solution offers much better material utilization than the prior art.

In one construction technique, this removal of the waste material 74 from bottom plate blank 72 during construction of bottom plate 44 occurs prior to welding of bottom plate 44 to other components to construct axle 40. In an alternative construction technique, bottom plate blank 72 is formed and then welded to other components. Thereafter, the waste material 74 is removed.

A preferred feature of the strip 70 from which the bottom plate is made is its section profile illustrated in FIG. 10. Strip 70 is preferably rolled such that its top 76 is flat to permit optimum weld land during construction of the fabricated axle, while its corners 78 are slightly rounded to provide an accommodating interface with attaching components. In this construction, attaching components do not bear on a sharp edge, which could create a notch, potentially reducing the fatigue life of the fabricated axle.

As shown in FIG. 11, after being cut from strip 70, the bottom plate blank 72 is bent to form the bottom plate 44 of fabricated axle 40. Bottom plate 44 includes a head portion 80 positioned at one end thereof, a transition zone portion 82 extending from head portion 80 at a bend 84, a body portion 86 extending from transition zone portion 82 at a bend 88, a transition zone portion 90 extending from body portion 86 at a bend 92, and a head portion 94 extending from transition zone portion 90 at a bend 96 and positioned on the other end of the bottom plate.

In a preferred arrangement, before machining, bottom plate 44 extends approximately 1,860 millimeters in length from its end at head portion 80 to its end at head portion 94 (most preferably 1,860.42 millimeters). As shown, bottom plate 44 is continuous with no seams or joints along its length. This characteristic increases the useful life of the fabricated axle in that the risk of cracking due to vertical loading is minimized.

In a preferred construction, bottom plate 44 is of constant thickness and has a constant section to provide adequate structural integrity in the king pin areas positioned in the head portions 80, 94. The preferred thickness ranges from twelve to sixteen millimeters, which takes into consideration optimum robustness and weight. The robust thickness across the full width of bottom plate 44 allows the vehicle to be jacked up at any point along the length of body portion 86, without risk of damage. The robust thickness of bottom plate 44 also provides foreign object protection so that the axle is not bent or damaged due to rock, debris and the like. It also provides a tie down for decking during transport.

In an alternative preferred construction, bottom plate 44 has a tapered construction, as desired. In this construction, the bottom plate is still continuous, but is taper rolled or machined such that it has optimum, varying thickness at all locations.

Another feature of bottom plate 44 is that the angle formed at bends 88, 92 for transition zone portions 82, 90, respectively, is sufficiently large enough to permit those bends to be positioned as far outboard as possible in order to reduce stresses due to vertical axle loading. Preferably, the angle (alpha) formed by bends 88, 92 is within the range of forty degrees to fifty degrees, most preferably equal to forty-five degrees. Smaller angles provide inadequate life in the welds at bends 88, 92, while larger angles make it impractical to package the tie rod arm components (not shown) for the vehicle.

FIG. 12 illustrates a detailed view of the head portion and transition zone portion for bottom plate 44 at one end thereof. In particular, head portion 80 and transition zone portion 82 are illustrated in FIG. 12. It will be appreciated that the description regarding FIG. 12 applies equally to head portion 94 and transition zone portion 90 of bottom plate 44.

As shown, transition zone portion 82 includes a tie rod clearance region 98, preferably configured in a waist-like shape. Tie rod clearance region 98 is formed when the bottom plate blank 72 is cut from the strip of material 70 (see FIG. 9). Tie rod clearance region 98 provides for tie rod and arm packaging, thereby allowing for high angle wheel cut.

With respect to head portion 80, a steering axis or king pin bore construction hole 100 is machined through it. King pin bore construction hole 100 is formed when the bottom plate blank 72 is cut from the strip of material 70 (see FIG. 9). This king pin bore construction hole is then machined preferably after construction of axle 40 to form a king pin bore. The construction of bottom plate 44 is such that the material around the king pin bore 100 in FIG. 18 has been made as large as reasonably possible to provide maximum structural integrity. In a preferred embodiment, the minimum distance from the center of king pin bore 100 to the edge of material is at least forty millimeters, and most preferably approximately forty-five millimeters. This construction provides increased fatigue life in braking and side loading.

Further regarding head portion 80, a steering stop 102 is integrally formed therewith when the bottom plate blank 72 is cut from the strip of material 70 (see FIG. 9). Steering stop 102 provides a contact zone for the steering stop bolt incorporated in steering systems utilized in vehicles. The integration of steering stop 102 into the construction of bottom plate 44 eliminates the need to weld additional components to fabricated axle 40 with that functionality.

Another feature of bottom plate 44 is that it is thick and heavy relative to main body 42 of fabricated axle 40. This moves the neutral axis of the section of fabricated axle 40 along the length of the body portion 86 of bottom plate 44 lower, which reduces tension stresses in the bottom plate and thereby extends its fatigue life. In all, an optimized, lighter section is formed.

Figure 13:
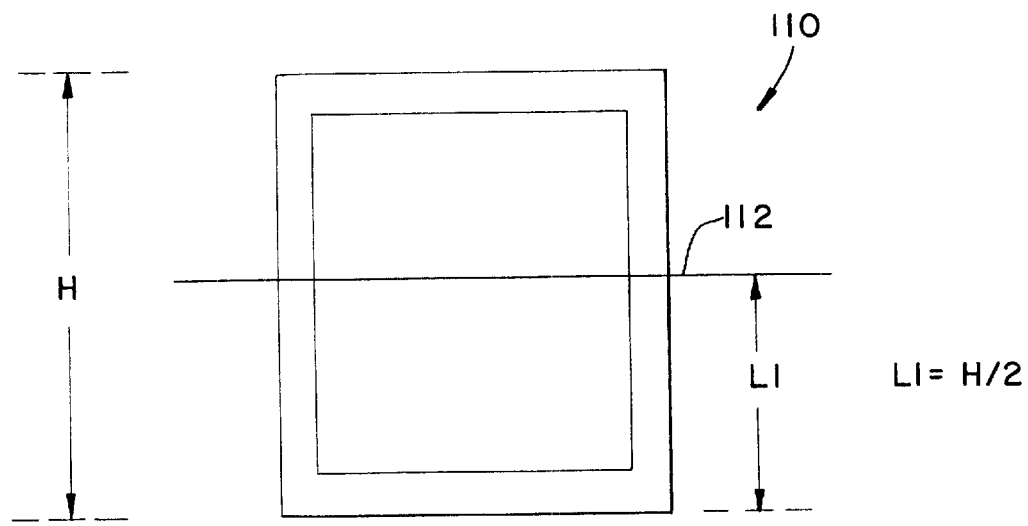
FIG. 13 is a diagrammatic view of a symmetric section, depicting the tension stress associated therewith.

Referring to FIG. 13, a symmetric section 110 is shown, such as would be the case if main body 42 and bottom plate 44 were formed to have identical thickness and weight characteristics. Under these circumstances, the neutral axis 112 would be positioned at a distance equal to half the height of section 110 from the bottom leg of the section.

Figure 14:
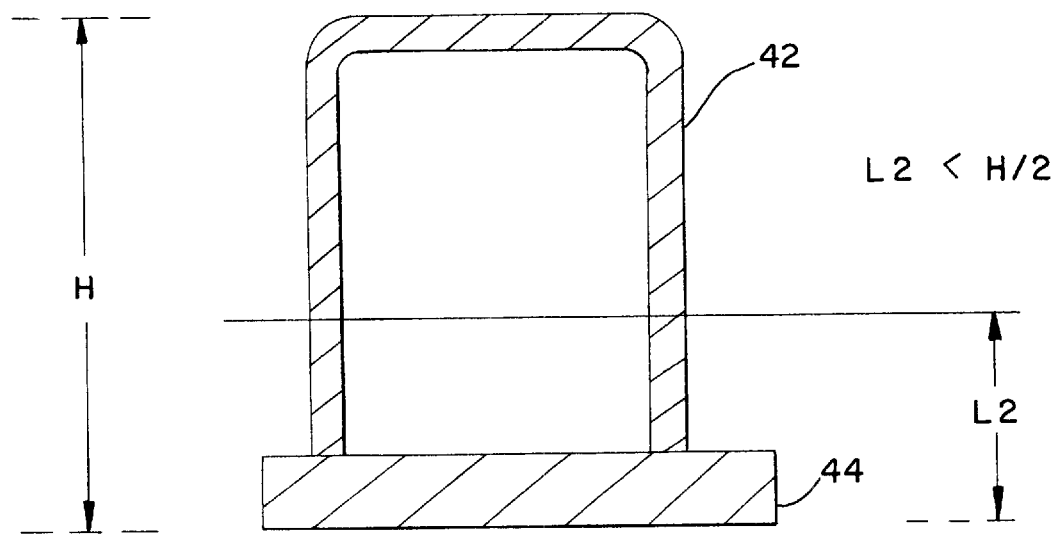
FIG. 14 is a diagrammatic view of the section formed by a fabricated vehicle axle constructed in accordance with the principles of the present invention, depicting the tension stress associated therewith.

Referring to FIG. 14, the asymmetric section 114 formed by the main body 42 and bottom plate 44 of fabricated axle 40 is shown. Because bottom plate 44 is thick and heavy relative to main body 42, the neutral axis 116 of fabricated axle 40 is positioned lower than half the height of the section from the bottom plate. This reduces tension stresses in bottom plate 44 and extends its fatigue life. As a result, a robust, lighter section is formed.

Figure 16:
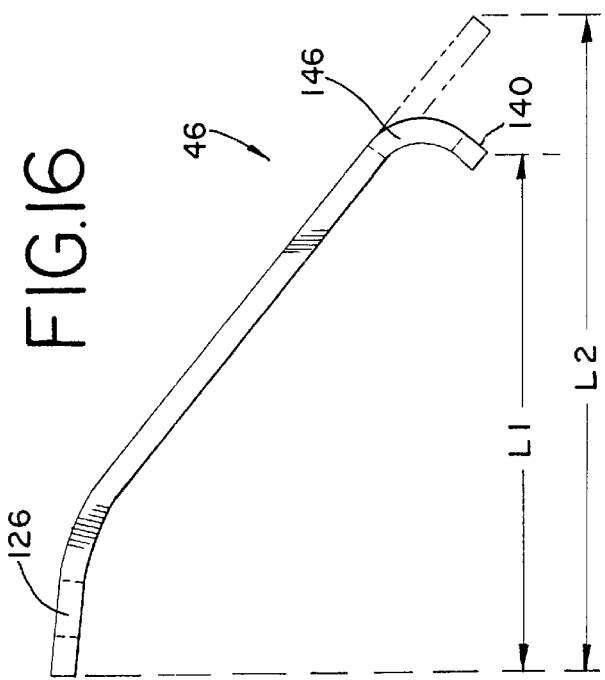
FIG. 16 is a front elevational view of a top plate used in the fabricated vehicle axle shown in FIG. 4.
Figure 17:
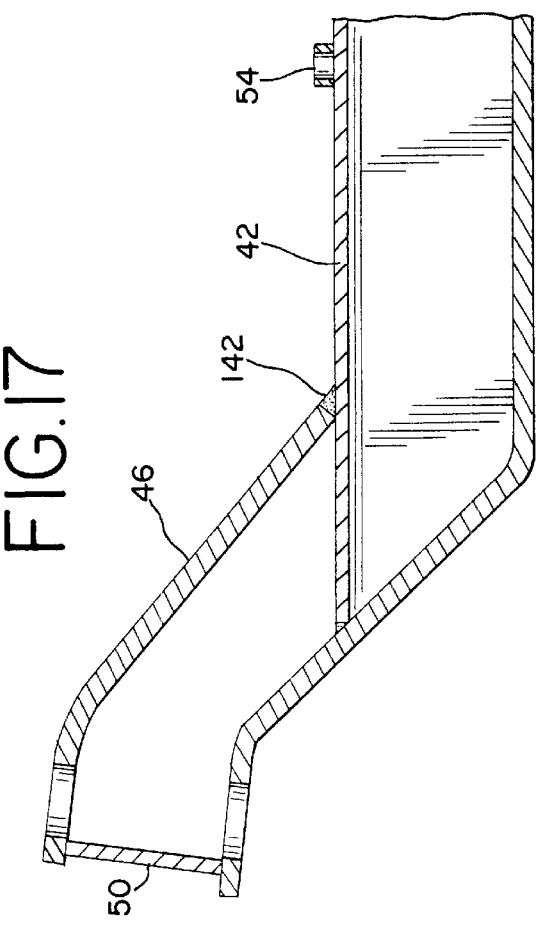
FIG. 17 is a fragmentary sectional view of the fabricated vehicle axle shown in FIG. 5 taken along lines 17—17 thereof.
Figure 15:
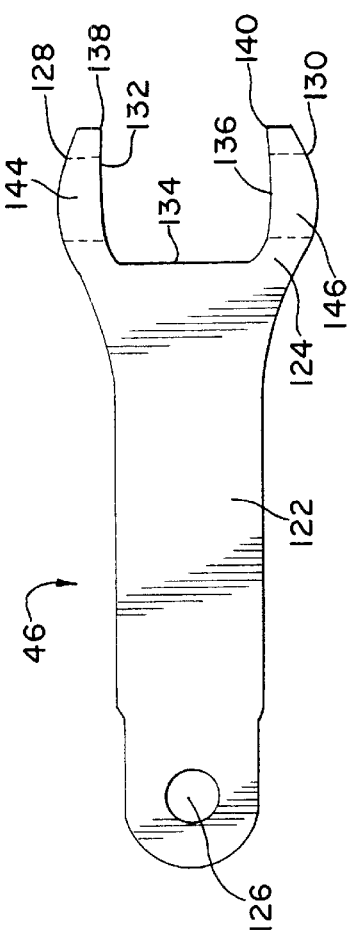
FIG. 15 is a top plan view of a top plate used in the fabricated vehicle axle shown in FIG. 4.

FIGS. 15–17 illustrate one of the top king pin plates 46, 48 for fabricated vehicle axle 40. King pin plate 46 is shown, but it will be appreciated that this description applies equally to king pin plate 48.

As shown, top king pin plate 46 includes a head portion 120, a body portion 122 and a curved fork portion 124. A king pin bore 126 is machined through head portion 120 at a position where it is designed to align substantially with the king pin bore construction hole 100 machined through bottom plate 44 (see FIG. 12). Curved fork portion 124 is formed by two legs 128, 130, which are separated by a region defined by weld surfaces 132, 134, 136. Weld termination points 138, 140 are positioned at the edges of weld surfaces 132, 136, respectively. As shown in FIG. 17, top king pin plate 46 is welded to main body 42 by a weld line 142 that extends from weld termination point 138 to weld termination point 140, along weld surfaces 132, 134 and 136.

FIG. 16 shows that head portion 120 and body portion 122 are separated by a bend 144. A bend 146 is also incorporated into curved fork portion 124 to cause the fork portion to form a reversed curved fork portion. Bend 146 preferably forms a ninety degree angle relative to a straight fork configuration. The preferred construction of top king pin plate 46 is such that the distance L1 shown in FIG. 16 for the curved fork portion is approximately equal to three hundred thirty millimeters. For a straight fork portion, the distance L2 would be approximately four hundred fifty millimeters. This feature increases the useful life for axle 40 by reducing stresses during longitudinal loading.

In addition, the curved fork portion 124 of top king plate 146 is such that the weld ends are positioned above the vertical loading neutral axis. Most preferably the weld ends are positioned at or above half the section height, ensuring that they are above the vertical loading neutral axis. This helps prevent cracks during vertical loading.

In view of the foregoing, the weld line ends positioned at weld termination points 138, 140 are positioned in low stress regions for bending stresses about the vertical axis, and stresses resulting from longitudinal forces at the vehicle wheel creating bending moment about the vertical axis.

Figure 18:
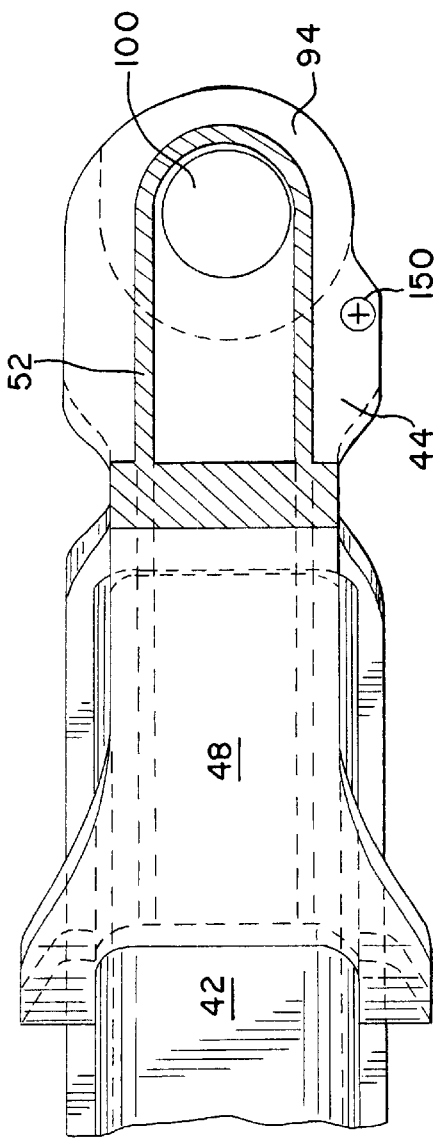
FIG. 18 is a sectional view of the fabricated vehicle axle shown in FIG. 5 taken along lines 18—18 thereof.

FIG. 18 illustrates a sectional view of one end of the fabricated axle 40. As shown, a machining datum 150 is included in bottom plate 44 in order to aid during the fabrication process for axle 40. Another machining datum is similarly positioned at the other end of bottom plate 44. The drop of axle from machining datum 150 to suspension seat area 56 (see FIG. 4) is controlled during the fabrication process. The flat for the thrust washer is then machined relative to machining datum 150 to ensure that only approximately one millimeter of material must be removed to provide a flat surface. This ensures adequate thickness of the bottom plate 44, which enhances structural integrity in the head portion 94 of the bottom plate.

As further shown in FIG. 18, king pin bore 100 is offset to the rear of the axle, providing for additional tie rod clearance. In an alternative construction, the head portion 94 of bottom plate 44 could be constructed such that a large offset, typically within the range of zero to seventy millimeters, could be designed to provide even further steering and brake clearance.

Figure 19:
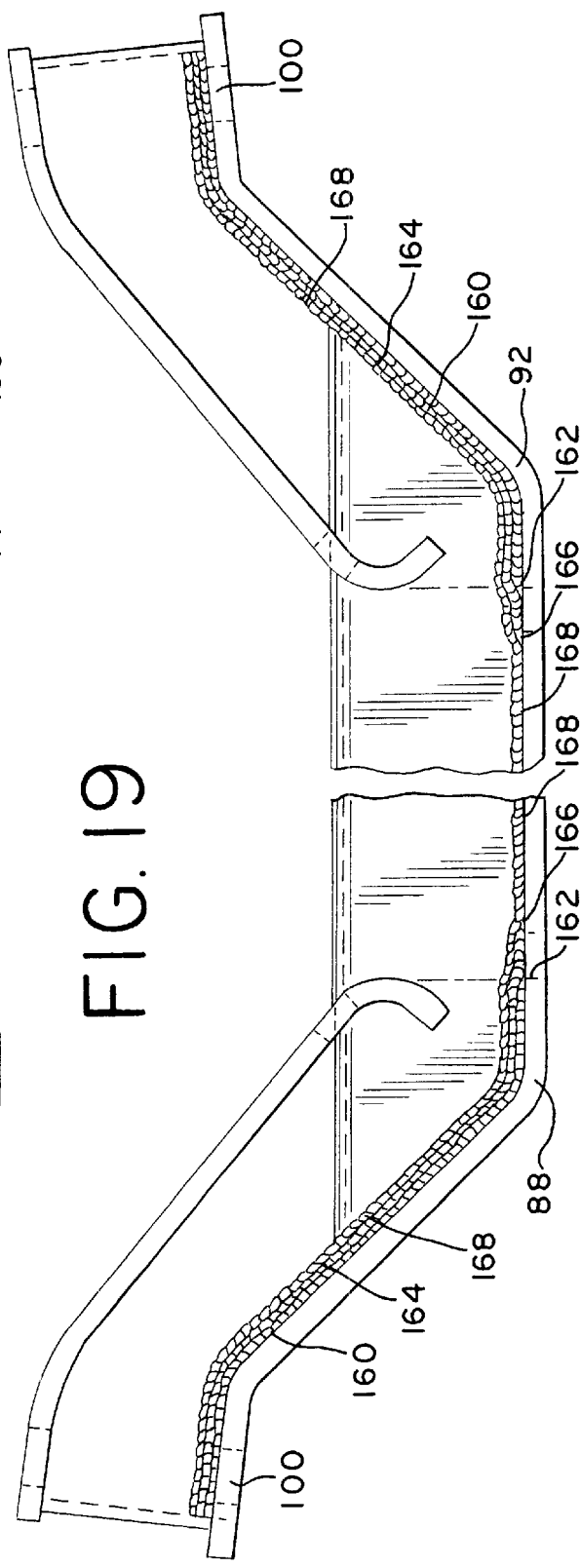
FIG. 19 is a broken away elevational view of the fabricated vehicle axle shown in FIG. 4 depicting features of the welding used to construct the axle.

FIG. 19 illustrates certain of the weld features for fabricated axle 40. As shown, a three pass weld is formed at each end of the fabricated axle. In particular, a root pass 160 begins outboard of king pin bore 100 and extends without stop to a point 162, which is preferably positioned between seventy-five millimeters and one hundred twenty-five millimeters inboard of bend 88. A second pass 164 also begins outboard of king pin bore 100 and extends without stop to a point 166 positioned inboard of point 162, preferably between ten and thirty millimeters inboard of point 162. In this arrangement, second pass 164 obliterates the weld stop created by root pass 160 at point 162. A final pass 168 also begins outboard of king pin bore 100 and extends without stop to a point positioned on the opposite end of fabricated axle 40, which is positioned outboard of the king pin bore 100 positioned at that opposite end of the axle. In this arrangement, final pass 168 obliterates the weld stop created by second pass 164 at point 166. At bend 88, main body 42 can be weld prepped for approximately fifty millimeters on each side of the bend center for bend 88 so that a full penetration weld can be achieved.

In view of the foregoing weld features, a three pass weld is formed at each end of axle 40, which provides for fatigue resistance in brake and vertical loading. All passes start at a point outboard of king pin bore 100 so that a stress riser is not created. The obliteration of the weld stops for the first (root) and second passes enhances fatigue life due to vertical loading.

While this invention has been described with reference to certain illustrative aspects, it will be understood that this description shall not be construed in a limiting sense. Rather, various changes and modifications can be made to the illustrative embodiments without departing from the true spirit and scope of the invention, as defined by the following claims.

Furthermore, it will be appreciated that any such changes and modifications will be recognized by those skilled in the art as an equivalent to one or more elements of the following claims, and shall be covered by such claims to the fullest extent permitted by law.

What is claimed is:

1. A fabricated vehicle axle, comprising:
    a main body having an inverted U-shaped configuration;
    a continuous bottom plate welded to said main body having a first end with a first king pin bore extending through it and a second end with a second king pin bore extending through it;
    a first king pin top plate welded to said main body having a third king pin bore extending through it in substantial alignment with said first king pin bore;
    a second king pin top plate welded to said main body having a fourth king pin bore extending through it in substantial alignment with said second king pin bore;
    a first gooseneck part welded to said first king pin top plate and said first end of said bottom plate; and
    a second gooseneck part welded to said second king pin top plate and said second end of said bottom plate.

2. The fabricated vehicle axle as defined by claim 1 wherein said main body includes suspension seat areas for said vehicle axle.

3. The fabricated vehicle axle as defined by claim 1 wherein said main body includes tapering edges at opposite ends thereof.

4. The fabricated vehicle axle as defined by claim 1 wherein said main body is formed from a main body blank.

5. The fabricated vehicle axle as defined by claim 1 wherein said main body is formed entirely from a main body blank.

6. The fabricated vehicle axle as defined by claim 4 wherein said main body blank used to form said main body comprises a rectangular strip of material.

7. The fabricated vehicle axle as defined by claim 1 wherein said main body is formed from a roll formed channel.

8. The fabricated vehicle axle as defined by claim 1 wherein said bottom plate is formed from a bottom plate blank.

9. The fabricated vehicle axle as defined by claim 1 wherein said bottom plate is formed entirely from a bottom plate blank.

10. The fabricated vehicle axle as defined by claim 8 wherein said bottom plate blank used to form said bottom plate comprises a rectangular strip of material.

11. The fabricated vehicle axle as defined by claim 8 wherein said bottom plate blank is rolled to have a flat top surface and slightly rounded corners on a surface opposing said flat top surface.

12. The fabricated vehicle axle as defined by claim 1 wherein said bottom plate includes a first head portion positioned at said first end thereof and a second head portion positioned at a second end thereof.

13. The fabricated vehicle axle as defined by claim 12 wherein said bottom plate includes a first transition zone portion adjacent to said first head portion and extending therefrom at a first bend, a body portion adjacent to said first transition zone portion and extending therefrom at a second bend, a second transition zone portion adjacent to said body portion and extending therefrom at a third bend, said second transition zone portion also being adjacent to said second head portion and extending therefrom at a fourth bend.

14. The fabricated vehicle axle as defined by claim 1 wherein said bottom plate is of constant thickness.

15. The fabricated vehicle axle as defined by claim 14 wherein said constant thickness of said bottom plate is within a range of twelve to sixteen millimeters.

16. The fabricated vehicle axle as defined by claim 13 wherein said bottom plate includes a first angle formed by said second bend and a second angle formed by said third bend, said first and second angles being within a range of forty degrees to fifty degrees.

17. The fabricated vehicle axle as defined by claim 16 wherein said first angle is forty-five degrees and said second angle is forty-five degrees.

18. The fabricated vehicle axle as defined by claim 1 wherein said first transition zone portion includes a tie rod clearance region.

19. The fabricated vehicle axle as defined by claim 18 wherein said tie rod clearance region is configured in a waist-like shape in said transition zone portion.

20. The fabricated vehicle axle as defined by claim 12 wherein said first king pin bore extends through said first head portion.

21. The fabricated vehicle axle as defined by claim 1 wherein said bottom plate is constructed such that a minimum distance from a center of said first king pin bore to a closest edge of said bottom plate is at least forty millimeters.

22. The fabricated vehicle axle as defined by claim 22 wherein said minimum distance from said center of said first king pin bore to said closest edge of said bottom plate is approximately forty-five millimeters.

23. The fabricated vehicle axle as defined by claim 12 wherein said first head portion includes a steering stop integrally formed therewith.

24. The fabricated vehicle axle as defined by claim 1 wherein said bottom plate is relatively thick and relatively heavy compared to said main body.

25. The fabricated vehicle axle as defined by claim 24 wherein a section is formed by said bottom plate and said main body having a height defined by a distance between said bottom place and an opposing wall of said main body, said section further having a neutral axis positioned closer to said bottom plate than half of a height of said section.

26. The fabricated vehicle axle as defined by claim 1 wherein said first king pin top plate includes a head portion, a body portion and a curved fork portion.

27. The fabricated vehicle axle as defined by claim 26 wherein said third king pin bore extends through said head portion of the first king pin top plate.

28. The fabricated vehicle axle as defined by claim 26 wherein said curved fork portion includes a first leg and a second leg.

29. The fabricated vehicle axle as defined by claim 28 wherein said first and second legs of said curved fork portion are separated.

30. The fabricated vehicle axle as defined by claim 26 wherein said curved fork portion includes a bend such that said curved fork portion comprises a reversed curved fork portion.

31. The fabricated vehicle axle as defined by claim 30 wherein said bend of said curved fork portion forms a ninety degree angle.

32. The fabricated vehicle axle as defined by claim 1 wherein said first king pin top plate is welded to said main body by weld lines having weld ends, said main body and said bottom plate define a vertical loading neutral axis of said fabricated vehicle axle, and said first king pin top plate is configured such that the weld ends are positioned above the vertical loading neutral axis.

33. The fabricated vehicle axle as defined by claim 1 wherein said first head portion of said bottom plate includes a machining datum.

34. The fabricated vehicle axle as defined by claim 1 wherein said machining datum aids during fabrication of said fabricated vehicle axle.

35. The fabricated vehicle axle as defined by claim 1 wherein said first king pin bore extends through said head portion of said bottom plate at a position offset to a rear of said fabricated vehicle axle.

36. The fabricated vehicle axle as defined by claim 1 wherein said first king pin bore is positioned to provide additional tie rod clearance.

37. The fabricated vehicle axle as defined by claim 13 further comprising a three pass weld that welds said first end of said bottom plate to a corresponding end of said main body.

38. The fabricated vehicle axle as defined by claim 37 wherein said three pass weld includes a root pass extending from a root pass first point positioned outboard of said first king pin bore to a root pass second point positioned inboard of said second bend, a second pass extending from a second pass first point positioned outboard of said first king pin bore to a second pass second point positioned inboard of said root pass second point, and a final pass extending from a final pass first point positioned outboard of said first king pin bore to a final pass second point positioned outboard of said second king pin bore.

39. The fabricated vehicle axle as defined by claim 38 wherein said root pass second point is positioned between seventy-five millimeters and one hundred twenty-five millimeters inboard of said second bend.

40. The fabricated vehicle axle as defined by claim 38 wherein said second pass second point is positioned between ten millimeters and thirty millimeters inboard said root pass second point.

41. The fabricated vehicle axle as defined by claim 38 wherein said root pass forms a root pass weld stop at said root pass second point.

42. The fabricated vehicle axle as defined by claim 41 wherein said root pass weld stop is obliterated by said second pass.

43. The fabricated vehicle axle as defined by claim 38 wherein said second pass forms a second pass weld stop at said second pass second point.

44. The fabricated vehicle axle as defined by claim 43 wherein said second pass weld stop is obliterated by said final pass.

45. A bottom plate for a fabricated vehicle axle, comprising:
   a first head portion having a first king pin bore extending through it;
   a second head portion having a second king pin bore extending through it; and
   a body portion positioned between said first head portion and said second head portion.

46. The bottom plate as defined by claim 45 further comprising a first transition zone portion adjacent to said first head portion and extending therefrom at a first bend to a second bend at said body portion, said body portion extending from said second bend to a third bend, a second transition zone portion adjacent to said body portion and extending therefrom at said third bend, said second transition zone portion also being adjacent to said second head portion and extending therefrom at a fourth bend.

47. The bottom plate as defined by claim 45 having constant thickness.

48. The bottom plate as defined by claim 47 wherein said constant thickness is within a range of twelve to sixteen millimeters.

49. A bottom plate for a fabricated vehicle axle, comprising:
   a first head portion having a first king pin bore extending through it;
   a second head portion having a second king pin bore extending through it;
   a body portion positioned between said first head portion and said second head portion;
   a first transition zone portion adjacent to said first head portion and extending therefrom at a first bend to a second bend at a said body portion, said body portion extending from said second bend to a third bend, a second transition zone portion adjacent to said body portion and extending therefrom at said third bend, said second transition zone portion also being adjacent to said second head portion and extending therefrom at a fourth bend; and
   a first angle formed by said second bend and a second angle formed by said third bend, said first and second angles being within a range of forty degrees to fifty degrees;
   wherein said bottom plate having a constant thickness within a range of twelve to sixteen millimeters.

50. The bottom plate as defined by claim 49 wherein said first angle is forty-five degrees and said second angle is forty-five degrees.

51. A bottom plate for a fabricated vehicle axle, comprising:
   a first head portion having a first king pin bore extending through it;
   a second head portion having a second king pin bore extending through it;
   a body portion positioned between said first head portion and said second head portion; and
   a first transition zone portion adjacent to said first head portion and extending therefrom at a first bend to a second bend at said body portion, said body portion extending from said second bend to a third bend, a second transition zone portion adjacent to said body portion and extending therefrom at said third bend, said second transition zone portion also being adjacent to said second head portion and extending therefrom at a fourth bend, said first transition zone portion includes a tie rod clearance region.

52. The bottom plate as defined by claim 51 wherein said tie rod clearance region is configured in a waist-like shape in said first transition zone portion.

53. The bottom plate as defined by claim 45 being constructed such that a minimum distance from a center of said first king pin bore to a closest edge of said bottom plate is at least forty millimeters.

54. The bottom plate as defined by claim 53 being constructed such that said minimum distance from said center of said first king pin bore to said closest edge of said bottom plate is approximately forty-five millimeters.

55. A bottom plate for a fabricated vehicle axle, comprising:
   a first head portion having a first king pin bore extending through it and a steering stop integrally formed therewith;
   a second head portion having a second king pin bore extending through it; and
   a body portion positioned between said first head portion and said second head portion.

56. A bottom plate for a fabricated vehicle axle, comprising:
   a first head portion having a first king pin bore extending through it and a machining datum;
   a second head portion having a second king pin bore extending through it; and
   a body portion positioned between said first head portion and said second head portion.

57. The bottom plate as defined by claim 56 wherein said machining datum aids during fabrication of said fabricated vehicle axle.

58. A bottom plate for a fabricated vehicle axle, comprising:
   a first head portion having a first king pin bore extending through it, said first king pin bore extends through said first head portion at a position offset to a rear of said bottom plate;
   a second head portion having a second king pin bore extending through it; and
   a body portion positioned between said first head portion and said second head portion.

59. A bottom plate for a fabricated vehicle axle, comprising:
   a first head portion having a first king pin bore extending through it, said first king pin bore is positioned to provide additional tie rod clearance;
   a second head portion having a second king pin bore extending through it; and
   a body portion positioned between said first head portion and said second head portion.

60. A king pin top plate for a fabricated vehicle axle, comprising:
   a head portion having a king pin bore extending through it;
   a body portion adjacent to said head portion; and
   a curved fork portion adjacent to said body portion.

61. The king pin top plate as defined by claim 60 wherein said curved fork portion includes a first leg and a second leg.

62. The king pin top plate as defined by claim 61 wherein said first and second legs of said curved fork portion are separated.

63. The king pin top plate as defined by claim 60 wherein said curved fork portion includes a bend such that said curved fork portion comprises a reversed curved fork portion.

64. The king pin top plate as defined by claim 63 wherein said bend of said curved fork portion forms a ninety degree angle.

65. A method of welding a fabricated vehicle axle having a main body and a bottom plate having a first head portion with a first king pin bore extending through it, a first transition portion adjacent to said first head portion and extending therefrom at a first bend, a body portion adjacent to said first transition portion and extending therefrom at a second bend, a second transition portion adjacent to said body portion and extending therefrom at a third bend, and a second head portion adjacent to said second transition portion and extending therefrom at a fourth bend, said second head portion having a second king pin bore extending through it, said method comprising the steps of:
   extending a first root pass weld between a first root pass first point positioned outboard said first king pin bore and a first root pass second point positioned inboard said second bend;
   extending a first middle pass weld between a first middle pass first point positioned outboard said first king pin bore and a first middle pass second point positioned inboard said first root pass second point;
   extending a second root pass weld between a second root pass first point positioned outboard said second king pin bore and a second root pass second point positioned inboard said third bend;
   extending a second middle pass weld between a second middle pass first point positioned outboard said second king pin bore and a second middle pass second point positioned inboard said second root pass second point; and
   extending a final pass weld between a final pass first point positioned outboard said first king pin bore and a final pass second point positioned outboard said second king pin bore.

66. A bottom plate for a fabricated vehicle axle, comprising:
   a first head portion having a first king pin bore extending through it;
   a second head portion having a second king pin bore extending through it;
   a body portion positioned between said first head portion and said second head portion;
   a first transition zone portion adjacent to said first head portion and extending therefrom at a first bend to a second bend at said body portion, said body portion extending from said second bend to a third bend, a second transition zone portion adjacent to said body portion and extending therefrom at said third bend, said second transition zone portion also being adjacent to said second head portion and extending therefrom at a fourth bend; and a first angle formed by said second bend and a second angle formed by said third bend, said first and second angles being within a range of forty degrees to fifty degrees.

67. The bottom plate as defined by claim 66 wherein said first angle is forty-five degrees and said second angle is forty-five degrees.

68. The bottom plate as defined by claim 66 wherein said first transition zone portion includes a tie rod clearance region.

69. The bottom plate as defined by claim 68 wherein said tie rod clearance region is configured in a waist-like shape in said first transition zone portion.

70. The bottom plate as defined by claim 66 being constructed such that a minimum distance from a center of said first king pin bore to a closest edge of said bottom plate is at least forty millimeters.

71. The bottom plate as defined by claim 70 being constructed such that said minimum distance from said center of said first king pin bore to said closest edge of said bottom plate is approximately forty-five millimeters.

72. The bottom plate as defined by claim 66 wherein said first head portion includes a steering stop integrally formed therewith.

73. The bottom plate as defined by claim 66 wherein said first head portion includes a machining datum.

74. The bottom plate as defined by claim 73 wherein said machining datum aids during fabrication of said fabricated vehicle axle.

75. The bottom plate as defined by claim 66 wherein said first king pin bore extends through said first head portion at a position offset to a rear of said bottom plate.

76. The bottom plate as defined by claim 66 wherein said first king pin bore is positioned to provide additional tie rod clearance.

77. A bottom plate for a fabricated vehicle axle comprising:

a first head portion having a first king pin bore extending through it;

a second head portion having a second king pin bore extending through it; and a body portion positioned between said first head portion and said second head portion;

wherein said bottom plate has at least two rounded corners.

78. The bottom plate as defined by claim 77 further comprising a first transition zone portion adjacent to said first head portion and extending there from at a first bend to a second bend at said body portion, said body portion extending from said second bend to a third bend, a second transition zone portion adjacent to said body portion and extending therefrom at said third bend, said second transition zone portion also being adjacent to said second head portion and extending therefrom at a fourth bend.

79. The bottom plate as defined by claim 77 having constant thickness.

80. The bottom plate as defined by claim 79 wherein said constant thickness is within a range of twelve to sixteen millimeters.

81. The bottom plate as defined by claim 80 further including a first angle formed by said second bend and a second angle formed by said third bend, said first and second angles being within a range of forty degrees to fifty degrees.

82. The bottom plate as defined by claim 81 wherein said first angle is forty-five degrees and said second angle is forty-five degrees.

83. The bottom plate as defined by claim 77 wherein said first transistion zone portion includes a tie rod clearance region.

84. The bottom plate as defined by claim 83 wherein said tie rod clearance region is configured in a waist-like shape in said first transition zone portion.

85. The bottom plate as defined by claim 77 being constructed such that a minimum distance from a center of said first king pin bore to a closest edge of said bottom plate is at least forty millimeters.

86. The bottom plate as defined by claim 85 being constructed such that said minimum distance from said center of said first king pin bore to said closest edge of said bottom place is approximately forty-five millimeters.

87. The bottom plate as defined by claim 77 wherein said first head portion includes a steering stop integrally formed therewith.

88. The bottom plate as defined by claim 77 wherein said first head portion includes a machining datum.

89. The bottom plate as defined by claim 88 wherein said machining datum aids during fabrication of said fabricated vehicle axle.

90. The bottom plate as defined by claim 77 wherein said first king pin bore extends through said first head portion at a position offset to a rear of said bottom plate.

91. The bottom plate as defined by claim 77 wherein said first king pin bore is positioned to provide additional the rod clearance.

92. The bottom plate as defined by claim 66 having constant thickness.

* * * * *